(12) United States Patent
Kritzer et al.

(10) Patent No.: US 11,374,279 B2
(45) Date of Patent: Jun. 28, 2022

(54) ENERGY STORAGE SYSTEM

(71) Applicant: Carl Freudenberg KG, Weinheim (DE)

(72) Inventors: Peter Kritzer, Forst (DE); Reiner Dirr, Munich (DE); Olaf Nahrwold, Ludwigshafen (DE); Michael Klemt, Pfedelbach (DE)

(73) Assignee: CARL FREUDENBERG KG, Weinheim (DE)

( * ) Notice: Subject to any disclaimer, the term of this patent is extended or adjusted under 35 U.S.C. 154(b) by 223 days.

(21) Appl. No.: 16/642,908

(22) PCT Filed: Aug. 2, 2018

(86) PCT No.: PCT/EP2018/070964
§ 371 (c)(1),
(2) Date: Feb. 28, 2020

(87) PCT Pub. No.: WO2019/042698
PCT Pub. Date: Mar. 7, 2019

(65) Prior Publication Data
US 2020/0343495 A1 Oct. 29, 2020

(30) Foreign Application Priority Data
Aug. 29, 2017 (DE) .......................... 102017008102.6

(51) Int. Cl.
H01M 50/20 (2021.01)
H01M 10/653 (2014.01)
(Continued)

(52) U.S. Cl.
CPC ......... *H01M 50/20* (2021.01); *H01M 10/647* (2015.04); *H01M 10/653* (2015.04); *H01M 10/659* (2015.04); *H01M 10/6555* (2015.04); *H01M 50/291* (2021.01); *H01M 50/293* (2021.01)

(58) Field of Classification Search
CPC combination set(s) only.
See application file for complete search history.

(56) References Cited

U.S. PATENT DOCUMENTS 5,578,393 A 11/1996 Haskins
8,304,103 B2 11/2012 Watanabe
(Continued)

FOREIGN PATENT DOCUMENTS

CN 101533924 A 9/2009
CN 106960924 A 7/2017
(Continued)

*Primary Examiner* — Jonathan Crepeau
(74) *Attorney, Agent, or Firm* — Leydig, Voit & Mayer, Ltd.

(57) ABSTRACT

An energy storage system includes a housing in which a plurality of storage cells are arranged. The storage cells are thermally insulated from each other via a device arranged between the storage cells. The device is designed in such a way that the storage cells are spaced apart from each other. The device is made from temperature-resistant material. The device has projections and depressions. The device contains a material which is configured to be subjected to an endothermic chemical conversion when a temperature of 200° C. is exceeded.

9 Claims, 11 Drawing Sheets

(51) Int. Cl.
*H01M 10/6555* (2014.01)
*H01M 10/659* (2014.01)
*H01M 50/291* (2021.01)
*H01M 50/293* (2021.01)
*H01M 10/647* (2014.01)

(56) References Cited

U.S. PATENT DOCUMENTS

| | | |
|---|---|---|
| 9,312,580 B2 | 4/2016 | Nguyen |
| 2011/0070476 A1 | 3/2011 | Takahashi |
| 2011/0159340 A1 | 6/2011 | Hu |
| 2011/0189525 A1 | 8/2011 | Palanchon |
| 2012/0171554 A1 | 7/2012 | Kim |
| 2012/0270075 A1 | 10/2012 | Fujimura |
| 2013/0252063 A1 | 9/2013 | Park |
| 2015/0050539 A1* | 2/2015 | Peterl ............... H01M 10/6563 429/130 |
| 2015/0064523 A1 | 3/2015 | Lim |
| 2016/0064707 A1 | 3/2016 | Kritzer |
| 2016/0319174 A1 | 11/2016 | Razack |
| 2017/0098806 A1 | 4/2017 | Bowersock |
| 2017/0200934 A1 | 7/2017 | Yamanaka |
| 2017/0244088 A1 | 8/2017 | Narbonne |
| 2018/0309177 A1* | 10/2018 | Steil .................... H01M 50/116 |

FOREIGN PATENT DOCUMENTS

| | | |
|---|---|---|
| EP | 0454015 A1 | 10/1991 |
| EP | 2475027 A1 | 11/2012 |
| JP | 2015138753 A | 7/2015 |
| KR | 1020120079441 A | 7/2012 |
| KR | 1020150025758 A | 3/2015 |
| KR | 1020170005117 A | 1/2017 |

\* cited by examiner

US 11,374,279 B2

ENERGY STORAGE SYSTEM

CROSS-REFERENCE TO PRIOR APPLICATIONS

This application is a U.S. National Phase application under 35 U.S.C. § 371 of International Application No. PCT/EP2018/070964, filed on Aug. 2, 2018, and claims priority to German Patent Application No. DE 10 2017 008 102.6, filed on Aug. 29, 2017. The International Application was published in German on Mar. 7, 2019 as WO 2019/042698 under PCT Article 21(2) and is hereby incorporated by reference herein.

FIELD

The present invention relates to energy storage. The energy storage can be conducted via a system including a housing in which a plurality of storage cells is arranged. The storage cells can be thermally insulated from each other by means of a device arranged between the storage cells.

BACKGROUND

Energy storage systems, in particular rechargeable batteries for electrical energy, are widely used particularly in mobile systems. Rechargeable batteries for electrical energy are used, for example, in portable electronic devices, such as smart phones and laptops. Furthermore, rechargeable batteries for electrical energy are increasingly used for providing energy for electrically driven vehicles. Further fields of use of electrical energy storage systems are stationary applications, for example in backup systems, in network stabilization systems and for storing electrical energy from renewable energy sources.

SUMMARY

In an embodiment, the present invention provides an energy storage system including a housing in which a plurality of storage cells are arranged. The storage cells are thermally insulated from each other via a device arranged between the storage cells. The device is designed in such a way that the storage cells are spaced apart from each other. The device is made from temperature-resistant material. The device has projections and depressions. The device contains a material which is configured to be subjected to an endothermic chemical conversion when a temperature of 200° C. is exceeded.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
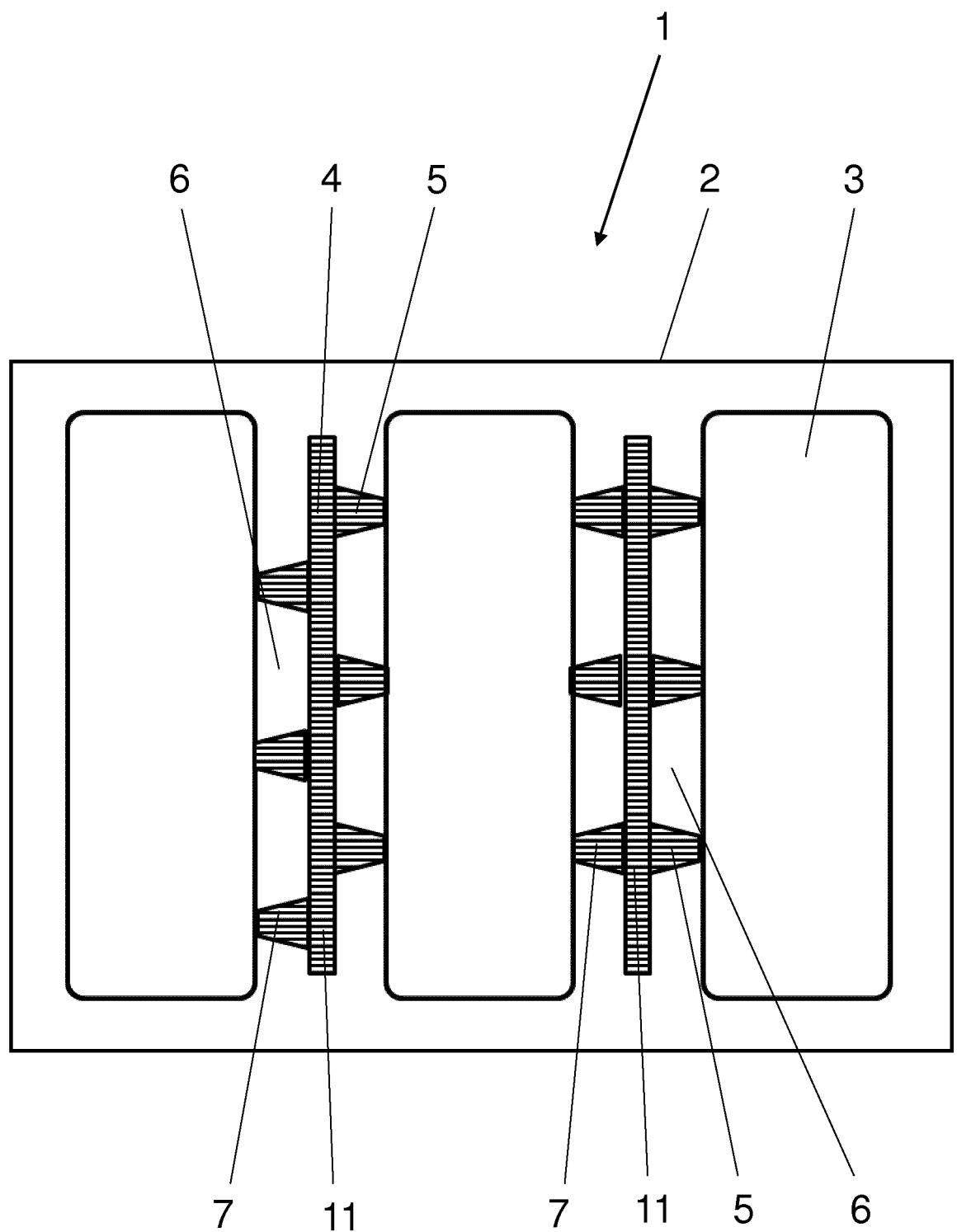
FIG. 1 depicts, according to an embodiment, an energy storage system having a device with spacers.

A frequently used energy storage system is a rechargeable battery in the form of a lithium-ion accumulator. Lithium ion accumulators, like other rechargeable batteries for electrical energy as well, usually have a plurality of storage cells which are installed together within one housing. A plurality of electrically interconnected storage cells forms a module.

The energy storage system extends not only to lithium-ion accumulators. Other rechargeable battery systems, such as lithium sulfur batteries, solid batteries or metal-air batteries, are also conceivable energy storage systems. Supercapacitors also come into consideration as energy storage systems.

Energy storage systems in the form of rechargeable batteries have the highest electrical capacity only within a limited temperature spectrum. If the optimum operating temperature range is exceeded or fallen below, the electrical capacity of the battery drops sharply or the functionality of the energy store is impaired.

Moreover, excessively high temperatures can lead to damage to the energy storage system. In this connection, in particular in the case of lithium-ion cells, the so-called thermal runaway is known. High amounts of thermal energy and gaseous degradation products become free in a short period of time, resulting in high pressure and high temperatures in the housing. This effect is particularly problematic in the case of energy storage systems with a high energy density, as is required, for example, for providing electrical energy for supplying electrically driven vehicles. Increasing amounts of energy of individual cells and increasing the packing density of the cells arranged in the housing intensify the problem of thermal runaway.

In the region of a runaway cell, temperatures in the range of 600° C. can arise over a period of about 30 seconds. The device for thermal insulation must withstand such stress and reduce the energy transfer to neighboring cells such that the temperature load of the neighboring cells is only about 150° C. Subsequently, it is necessary to replace the energy store or the defective cell. In this respect, it is indeed permissible for the device to change irreversibly during this process. It is essential to limit the energy transfer to neighboring cells in order to prevent them from also thermally running away.

An embodiment of the invention provides an energy storage system which has high operational reliability. The energy storage system comprises a housing in which a plurality of storage cells is arranged, wherein the storage cells are thermally insulated from each other by means of a device arranged between the storage cells, wherein the device is designed in such a way that the storage cells are spaced apart from each other, wherein the device is made from a temperature-resistant material. The cells can be prismatic cells or pouch cells. In addition, the invention also enables an adaptation to storage systems with round cells.

Since the storage cells are spaced apart from each other, direct heat transfer from one storage cell to an adjacent storage cell can be prevented. The heat transfer is reduced again by the device arranged between the storage cells. The device is preferably also elastic. As a result, the device can follow any dimensional changes of the storage cells and thus prevent an impermissibly high pressure from building up within the storage cells. Furthermore, the temperature-resistant embodiment of the device makes it possible to prevent the device from also being destroyed in the event of a thermal runaway of a storage cell so that a spreading of the thermal runaway to adjacent storage cells can be prevented. The elastic embodiment can be realized by choice of material and/or shaping of the device.

The device preferably has a low thermal conductivity. The thermal conductivity of the device is preferably at most 0.1 W/mK. In this context, it is particularly relevant to minimize the heat transfer between the cells. The device can be formed, for example, from a material with low thermal conductivity. Alternatively or additionally, the device may have a shape which reduces the heat transfer. This can be accomplished, for example, by reducing the contact area, by labyrinth structures and the like.

The device is preferably designed to be flat so that the storage cells can be supported on the device along the main sides that face each other. This results in a mechanically stable arrangement of the storage cells. In this embodiment, the assembly of the energy store is also simplified.

The device can be three-dimensionally structured. This forms zones of the device which bear against the storage cells and zones which are spaced apart from the storage cells. Cavities are formed which improve thermal insulation.

For this purpose, the device can have projections and depressions. Such a structuring results, for example, when the device is structured to be waffle-shaped. Furthermore, such an embodiment results when the device has a wavy profile.

In the case of a waffle-shaped structuring of the device, intersecting projections are produced which bear against the storage cells and cup-shaped depressions which are arranged between the projections. The depressions are not connected to each other in a flow-conducting manner. Small cavity cells are formed which have excellent thermal insulation. In connection with the use of an elastic material, it is advantageous in this embodiment that the cavity cells can function as suction cups at least during assembly so that the device is fixed to the cells by simply pressing it against them. This simplifies the assembly of the energy store. The cavity cells can have a rectangular, polygonal or round cross section.

It is also possible to profile the device with a wavy profile. This results in alternating projections and depressions, wherein the storage cells abut the device in a linear pattern along the projections and depressions. The depressions may be flowed through. This is advantageous in particular when the gas received in the depressions undergoes a large change in volume due to a strong temperature change. The gas can be transported away in the channels formed by the projections and the depressions.

Alternatively, it is possible for the device to have protruding webs. As a result, extensive zones which are spaced apart from the storage cells are formed. The contact region of the device with respect to the storage cells is relatively small.

In this context, it possible to select a different material for the webs than for the remaining regions of the device. In this embodiment, the webs are subject to the largest temperature load so that the webs can be selected from a particularly temperature-resistant material. In contrast, the remaining regions of the device can be selected from less expensive, less temperature-resistant material.

It is also possible for the device to have projections protruding in a punctiform manner. Such projections can in particular be embodied as knobs protruding from the surface of the projections. This embodiment results in a small contact surface of the device against the storage cell, whereby the heat transfer is limited. In the case of the thermal runaway, the material of the device is subjected to high thermal stress only in the region of the knobs. Arising gas can be transported away in the intermediate spaces between the knobs. In this case, the device can be designed in such a way that, even in the case of bulged cells as a result of the charge state and aging, there is an air cushion between the device and the storage cell. The knobs may consist of a different material than the base of the device. In this connection, it is advantageous to select a particularly temperature-resistant material for the knobs. The material requirement for designing the knobs is low so that a costly material can be selected.

In the new state of the storage cells, an elastically designed device establishes a defined positive connection between the device and the storage cells and still has a porosity in the aged state of the cells in order to ensure the thermal insulation.

The device can be designed in such a way that, between the section of the device assigned to the edge of the storage cells, a greater contact pressure of the device against the storage cell results than at the remaining sections. In this embodiment, the device can have circumferential webs which protrude further than the webs in the interior of the device. As a result, the outer regions of the device always abut the storage cells. Lithium-ion cells in particular are subject to a change in volume both as a result of charging processes and as a result of aging processes, wherein the storage cells can bulge out along the main sides. As a result of the device bearing against the storage cells with a greater preloading at the outer periphery than at the inner regions, the storage cells can expand, wherein the contact pressure of the storage cells on the device rises gradually in the inner regions. The device can extend at least in sections up to the end face of the storage cell. Frequently, storage cells are cuboid and have main sides that face each other.

A similar effect can be achieved if the device has a lower resistance to compression in the interior than in the edge region. This can be realized, for example, by thinner structures.

If the device extends at least in sections up to the end faces of the storage cells, the device can assume a sealing function in these regions and seal the storage cells with respect to the housing, for example.

The storage cell may have an emergency opening which is arranged on the end face, wherein the device surrounds the emergency opening. Prismatic lithium-ion cells in particular have such emergency openings. These can be in the form of a predetermined breaking point, that is to say, an intentional material weakening, or else in the form of a rupture disk. If the internal pressure of the storage cell rises sharply and finally exceeds a predetermined limit, the emergency opening opens and the pressure present within the storage cell is reduced. In most cases, the hot gases that are emitted are discharged through a collecting or outlet channel. This channel advantageously covers the emergency openings of the adjacent cells. Complete destruction of the entire energy storage system can thereby be prevented. The device surrounding the emergency opening forms an additional seal with respect to the outlet channel and enables the gas exiting the storage cell to be discharged in a targeted manner. For example, the exiting gas can be directed into an outlet channel. The device then additionally seals between the storage cell and the outlet channel.

The region of the section of the device assigned to the outlet channel can also be structured. In the case of an emergency opening, this ensures thermal insulation in this region. However, a planar design or a design in which the contours are designed as sealing elements arranged between the predetermined breaking point and the outlet channel, for example in the form of sealing lips, is also conceivable.

The device can be formed at least in sections from elastomeric material. In this case, it is advantageous that the device has elastic properties and, in particular, shape changes of the storage cells can be absorbed by shape changes of the device. Furthermore, elastomeric materials frequently have only a low thermal conductivity. An advantageous elastomeric material is, for example, silicone rubber. In addition to the low thermal conductivity, silicone rubber is characterized by being very temperature-resistant. Alternatively, it would be conceivable to form the device from fluororubber (FKM). However, in comparison to silicone rubber, this results in problematic fire behavior. Fluorosilicones are also conceivable for applications that are particularly subject to thermal stress.

In addition, inorganic fillers which improve the temperature resistance of elastomers and plastics can be added to the material.

Furthermore, thermally insulating fillers that create an intrinsic porosity and thus an intrinsic gas cushion in the interior of the material can be admixed to the material. This intrinsic porosity is present in addition to the macroscopic cavities formed by the structure as described above. In this connection, hollow glass spheres and highly porous inorganic materials, such as aerosils, expanded materials or aerogels, are conceivable, for example.

An embodiment in which the material contains fillers which function as latent heat accumulators is also conceivable. Such latent heat accumulator materials are, for example, phase change materials, wherein the material is preferably selected such that the phase transition between solid and liquid is at least 200° C. Furthermore, it is possible to use materials which undergo an endothermic reaction when heated above 200° C., for example by recrystallization or the release of crystal water. Such an embodiment results in an additional heat cushion and slows the heat transfer between the cells. Such materials are, for example, inorganic salts, such as nitrates or carbonates. Also conceivable are hydroxides or oxyhydroxides, which can split off water at increased temperatures. Energy levels of about 1,200 kJ/kg are typically absorbed in the water elimination of $Mg(OH)_2$ at temperatures above about 350° C. In the elimination of water from $Al(OH)_3$, amounts of energy of around 1,100 kJ/kg are absorbed at temperatures above about 250° C.

When pouch cells are used whose housings have a thermal loading capacity which is lower than that of prismatic or round cells, materials whose phase transition is at even lower temperatures, for example at a temperature of 150° C., can also be used. It is also conceivable to use a combination of a plurality of substances storing heat latently. For example, it is conceivable to combine a first substance having a phase transition at 300° C. with a second substance having a phase transition of 200° C.

Both the phase change material and the lastly mentioned salts may be encapsulated or incorporated into the device in porous fillers. If substances whose melting point or transformation temperature is above that of the process temperature of typically about 180° C. are used, encapsulation can be dispensed with. This increases the potential proportion of thermally active substances.

Mass fractions of more than 50% are conceivable but not necessarily required. It is also conceivable for the fillers to be introduced into a planar matrix, wherein the matrix is a part of the device. The matrix may, for example, consist of thermally resistant non-woven fabric. This embodiment allows a homogeneous distribution of the fillers over the surface of the device, wherein large amounts of filler can be introduced into the matrix. The fillers can be introduced into the planar matrix by customary processes, such as knife coating or padding. The matrix is preferably embedded in an elastomer.

Due to the desired high packing density, the device can observe the smallest possible space requirement. For this reason, the device can be designed as thin as possible. In the unloaded state, the device preferably has a thickness of at most 5 mm; preferably, the thickness is less than 1.5 mm. It is conceivable to achieve a thickness of the device in the range of 0.3 mm or less. In this case, the planar base of the device can have a thickness of 0.2 mm, in particular for mobile applications. In this case, the thickness of the two-sided projections abutting the storage cells amounts to 0.15 mm.

The figures show an energy storage system 1 for storing electrical energy. In the present case, the energy storage system 1 is designed as an accumulator, for example as a lithium-ion accumulator. The energy storage system 1 comprises a housing 2 in which a plurality of storage cells 3 is arranged. The storage cells 3 may be present in the form of prismatic cells and arranged next to each other in the housing 2.

The storage cells 3 are thermally insulated from each other by means of a device 4 arranged between the storage cells 3. In this case, the device 4 is designed such that the storage cells 3 are spaced apart from each other. Furthermore, the device 4 is made from temperature-resistant material.

FIG. 1 shows a first embodiment of an energy storage system 1. In this embodiment, the device 4 has a planar base 11 from which projections 5 protrude in the direction of the storage cells 3. In this respect, the device 4 is three-dimensional. The projections 5 take the form of webs 7. Depressions 6 are formed between the projections 5 so that insulating air cushions are produced. The contact surface of the projections 5 with respect to the storage cells 3 is small. The device 4 is formed from an elastomeric material, in this case a silicone rubber. The webs 7 can be arranged opposite each other or offset relative to each other on the base 11. The webs 7 mounted on a main side of the base 11 can intersect so that a waffle-shaped profiling of the device 4 results.

Figure 2:
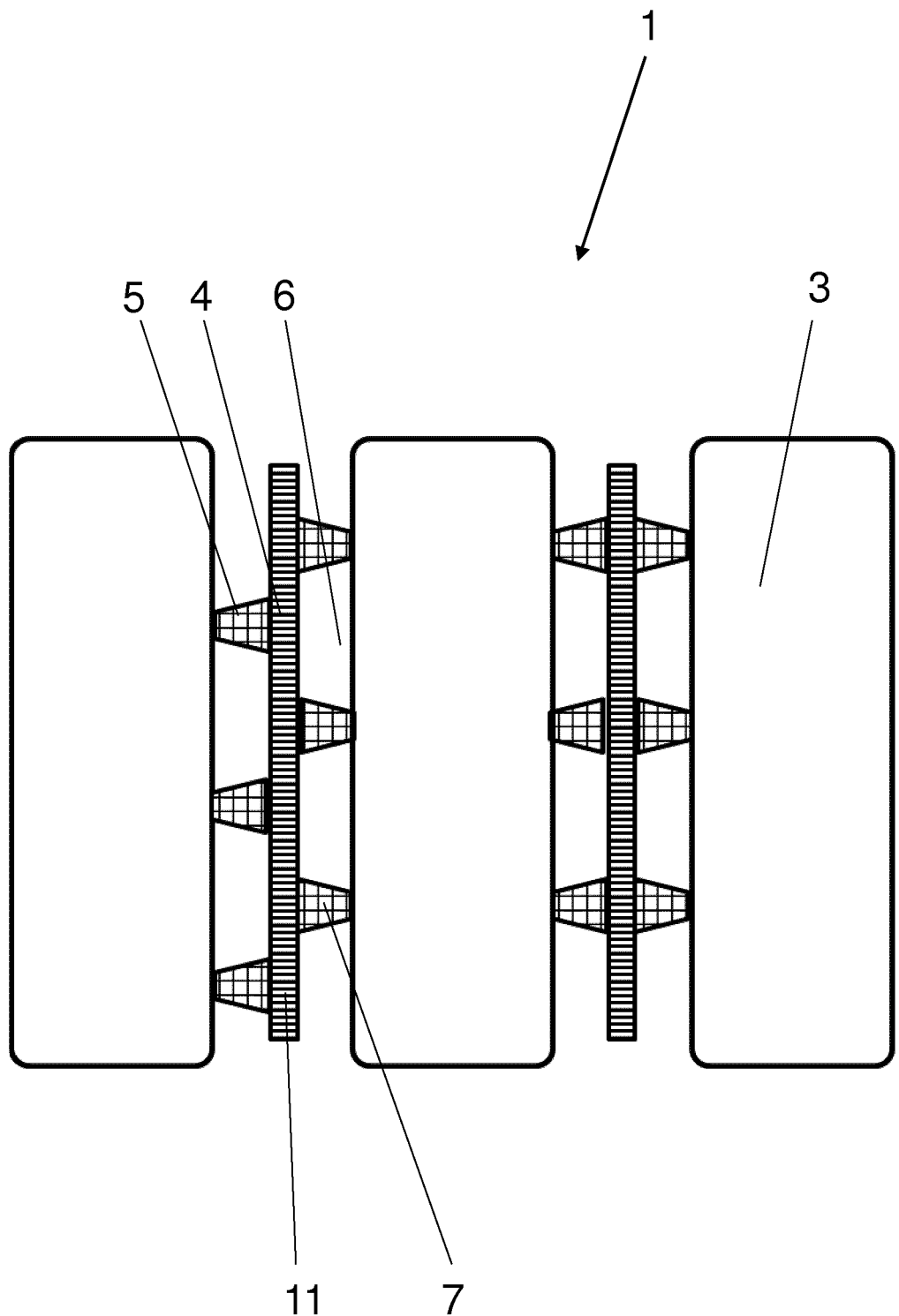
FIG. 2 depicts, according to an embodiment, an energy storage system according to FIG. 1 having a different material configuration.

FIG. 2 shows an embodiment according to FIG. 1 in which, in the present embodiment, the projections 5 or webs 7 consist of a material different from that of the base 11. The base 11 is made of a temperature-resistant and dimensionally stable material, while the projections 5 consist of a temperature-resistant and elastic material. A suitable material for the base 11 is, for example, a duromer, a mica foil or a glass fabric, and a silicone rubber, for example, comes into consideration as material for the projections 5.

Figure 3:
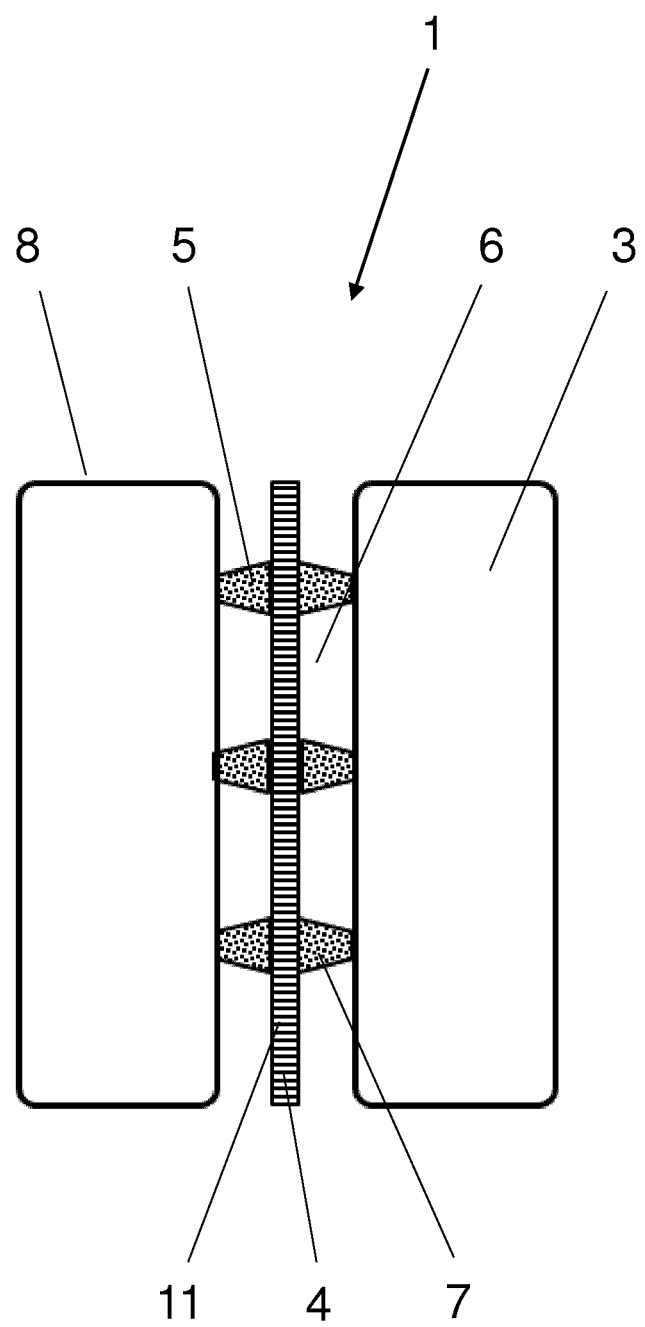
FIG. 3 depicts, according to an embodiment, an energy storage system according to FIG. 1 with porous spacers.

FIG. 3 shows an embodiment according to FIG. 1 in which the projections 5 or webs 7 comprise a porous material in the present embodiment. According to an advantageous embodiment, the projections 5 are formed from silicone rubber and are provided with porous fillers, for example hollow glass balls, expanded materials or aerogels. The porous fillers improve thermal insulation.

Figure 4:
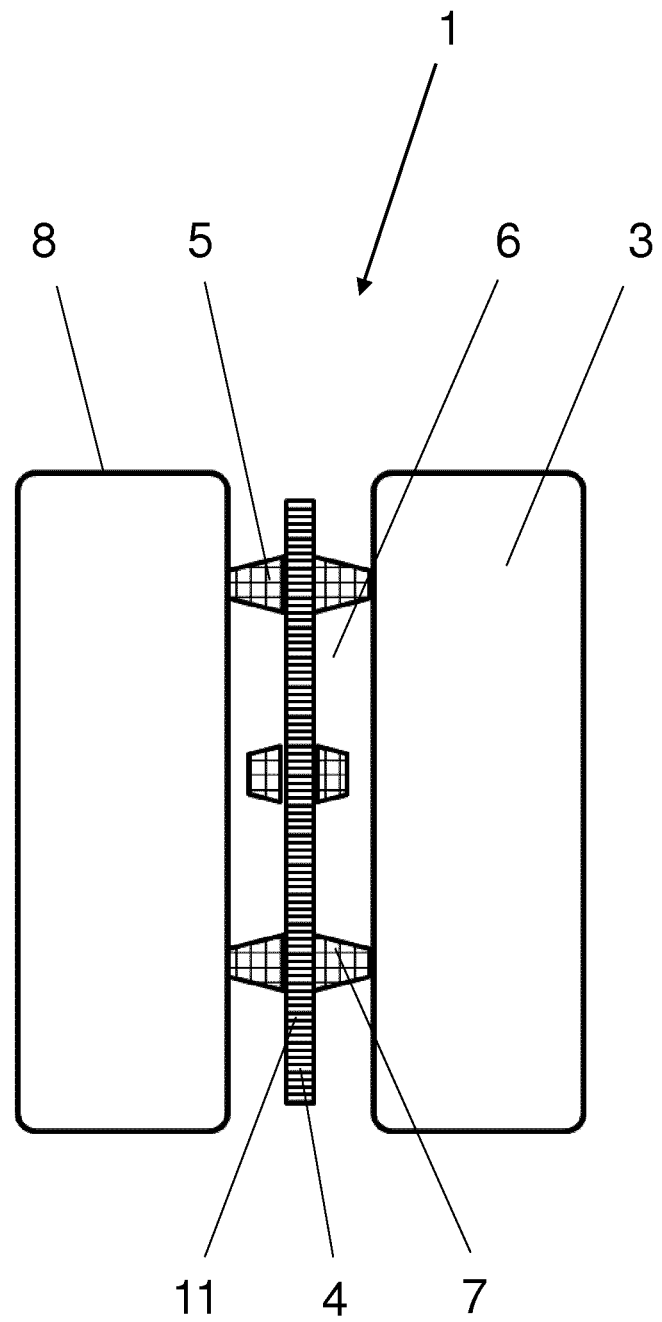
FIG. 4 depicts, according to an embodiment, a device with differently protruding spacers.

FIG. 4 shows an embodiment according to FIG. 1 in which the projections 5 or webs 7 of the device 4 protrude from the base 11 to different extents. In this case, the webs 7 which are assigned to the edge 8 of the storage cell 3 protrude further. In this embodiment, the webs 7 are spaced apart from the storage cells 3 in the central region so that the storage cells 3 can expand.

Figure 5:
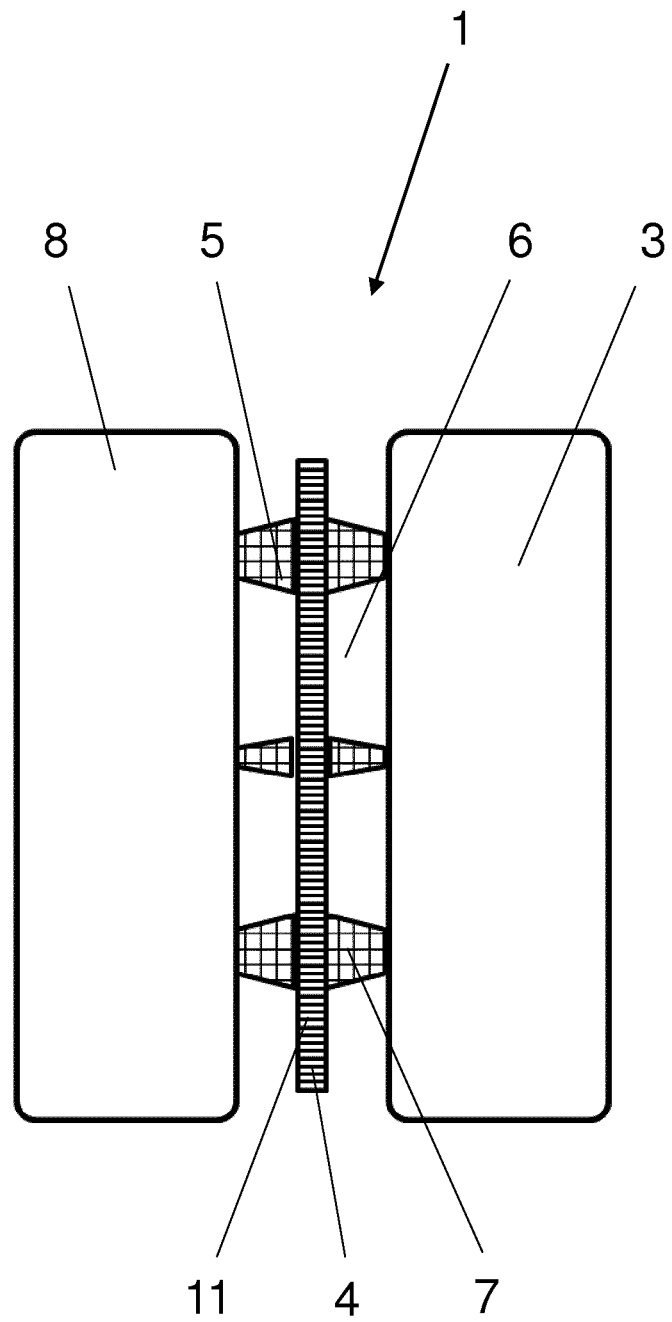
FIG. 5 depicts, according to an embodiment, a device with spacers of different dimensions.

FIG. 5 shows an embodiment according to FIG. 1 in which the projections 5 or webs 7 of the device 4 are dimensioned differently. In this case, the webs 7 which are assigned to the edge 8 of the storage cell 3 have a larger cross-sectional area. In this embodiment, the webs 7 in the central region have a smaller cross-sectional area. As a result, the webs 7 arranged on the inside can be deformed more easily so that small forces arise when the storage cells 3 expand.

Figure 6:
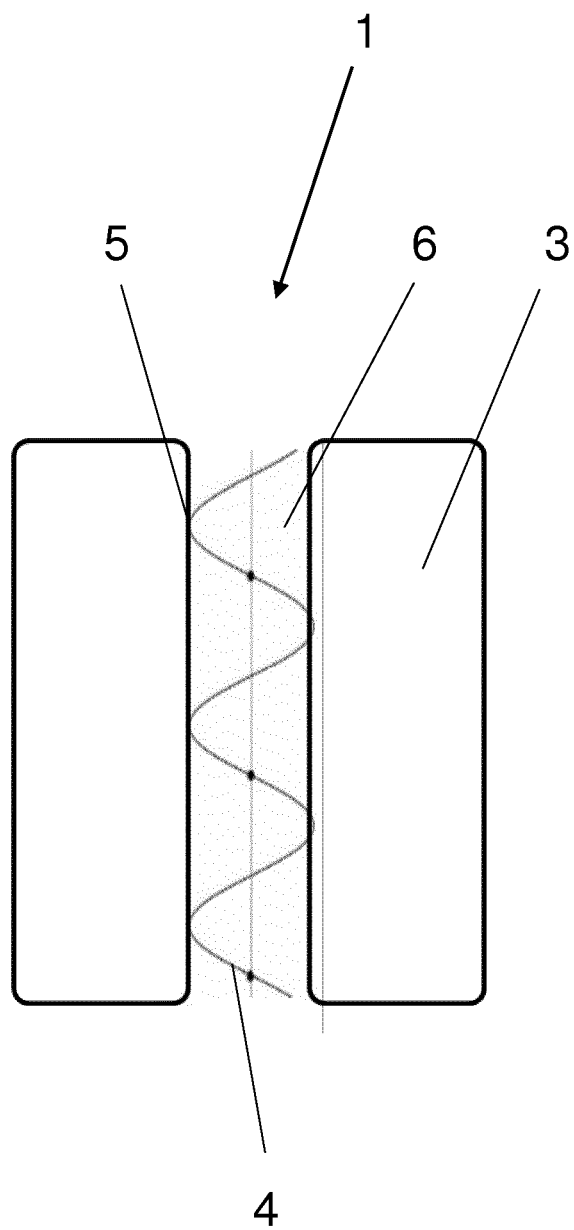
FIG. 6 depicts, according to an embodiment, a wavy device.

FIG. 6 shows a further embodiment of an energy storage system 1. In this embodiment, the device 4 has a wavy base 11 so that projections 5 are produced which bear against the storage cells 3, and depressions 6 which enclose an air cushion. In this respect, this device 4 is also three-dimensional. The projections 5 take the form of webs 7. The device 4 is formed from an elastomeric material, in this case a silicone rubber.

Figure 7:
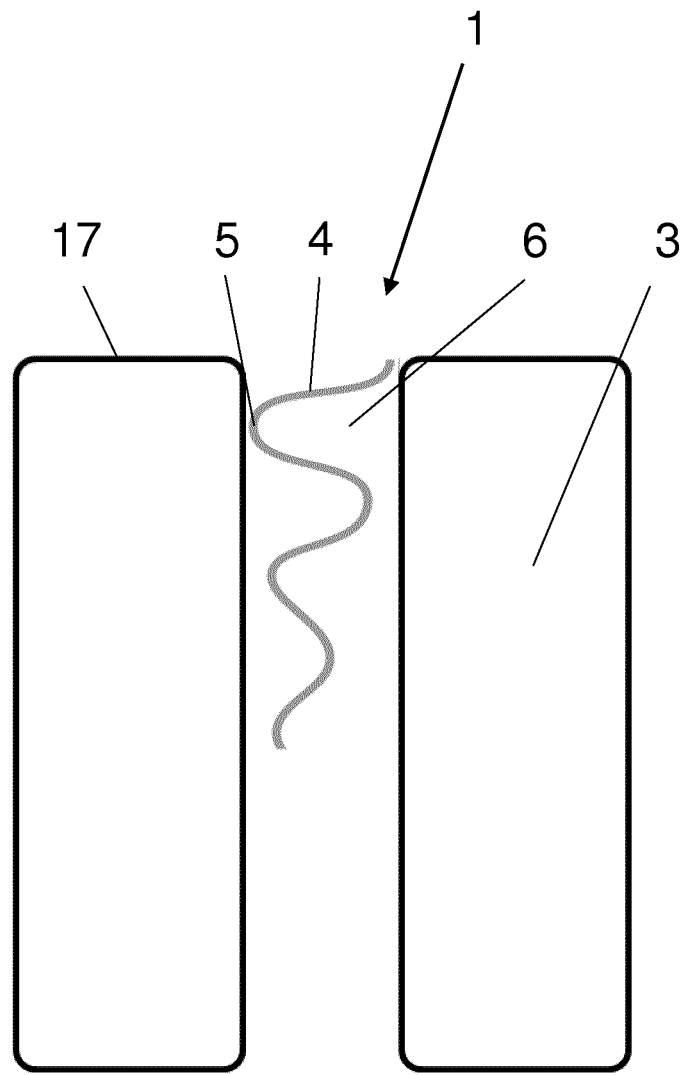
FIG. 7 depicts, according to an embodiment, a wavy device with an alternating wavy course.

FIG. 7 shows an embodiment according to FIG. 6 in which the wave structure is designed such that the wave amplitude of the device 4 in the section assigned to the edge 8 of the storage cell 3 is greater than in the inner region. As a result, the storage cells 3 can expand in this region.

Figure 8:
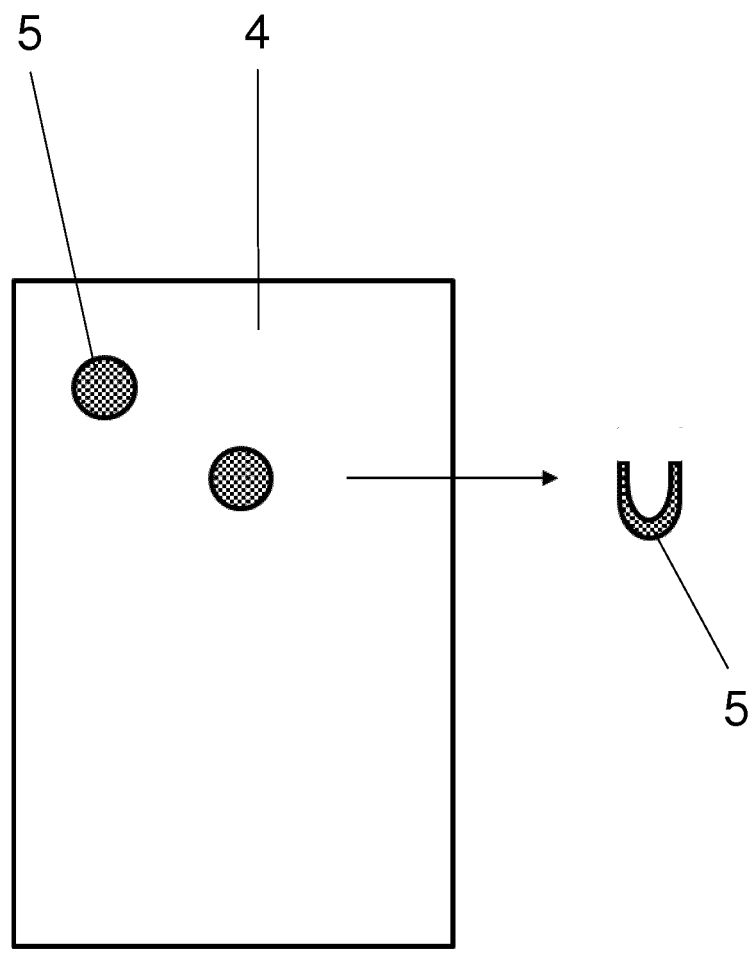
FIG. 8 depicts, according to an embodiment, a device with knob-shaped projections.

FIG. 8 shows a further embodiment of an energy storage system 1. In this embodiment, the device 4 has a planar base 11 from which knob-shaped projections 5 protrude in the direction of the storage cells 3. In this respect, the device 4 is three-dimensional. Depressions 6 are formed between the projections 5 so that insulating air cushions are produced. The device 4 is formed from an elastomeric material, in this case a silicone rubber. The projections 5 may be arranged opposite or offset from each other on the base 11. Alternatively, cup-shaped depressions, which form an air cushion, can be introduced into the base 11.

Figure 9:
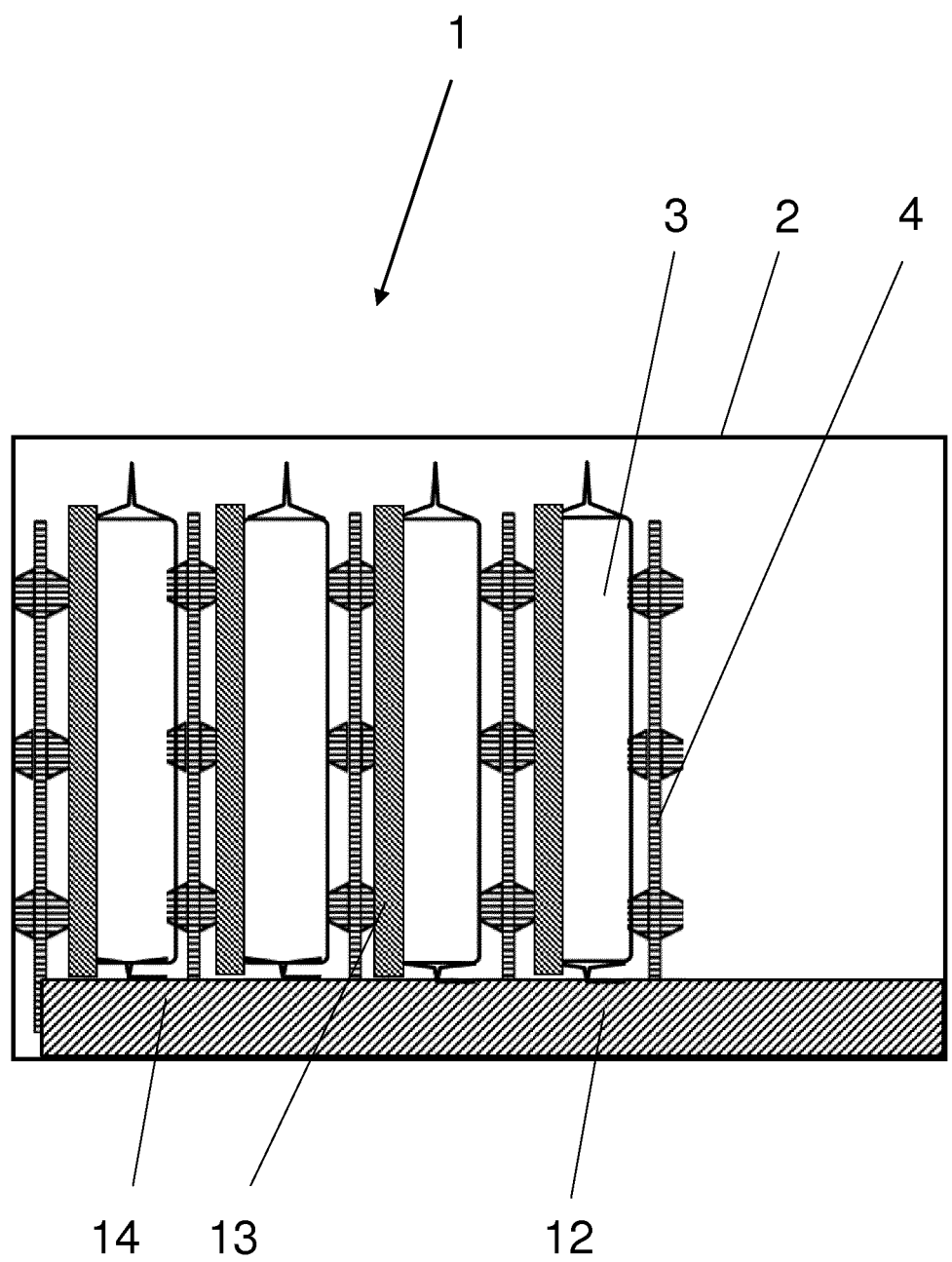
FIG. 9 depicts, according to an embodiment, an energy storage system with cooling device.

FIG. 9 shows an energy storage system 1 with an integrated cooling device 12. The cooling device 12 comprises cooling elements 13 which are arranged between the storage cells 3 and which are connected to a central unit 14. This results in a sandwich construction in which a storage cell 3, a device 4 and a cooling element 13 are alternately arranged in the housing 2. As a result, a device 4 is present on one side of a storage cell 3 and a cooling element 13 on the other side.

Figure 10:
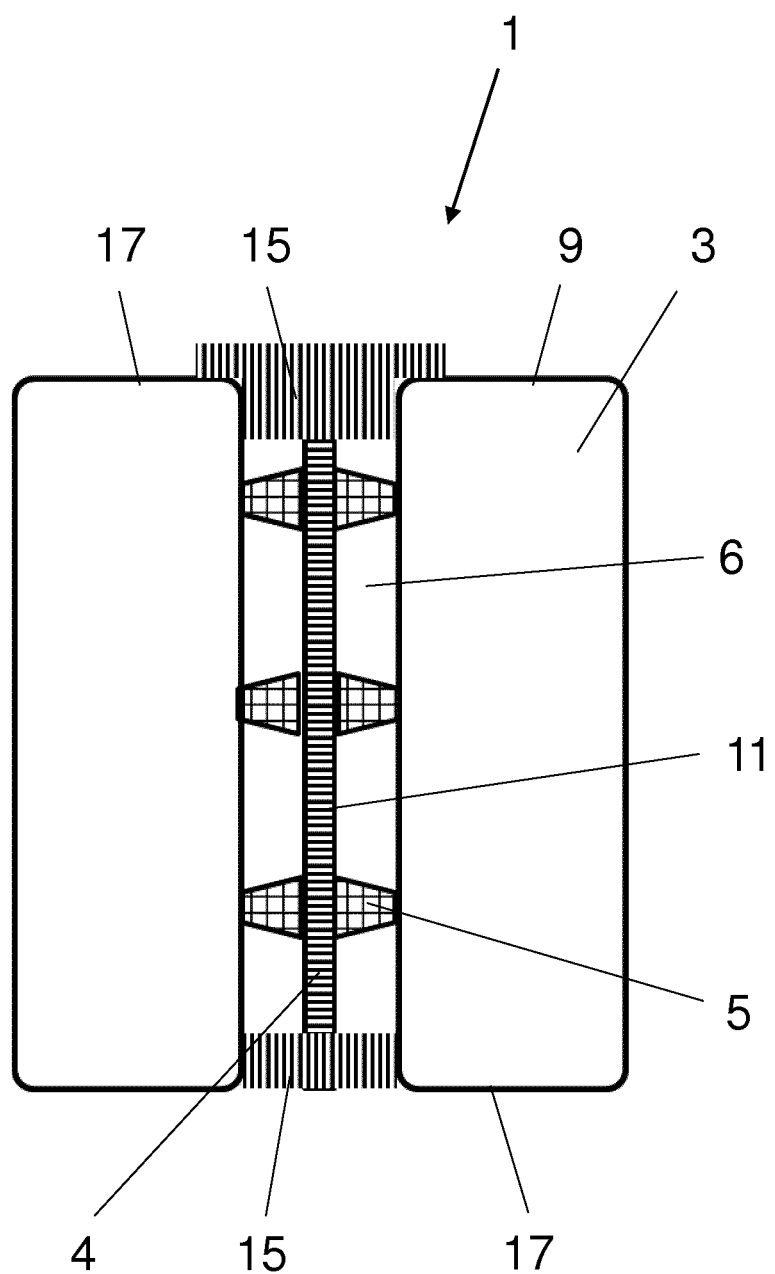
FIG. 10 depicts, according to an embodiment, a device with a peripheral fastening frame.

FIG. 10 shows an embodiment according to FIG. 1, wherein the device 4 is provided with a peripheral frame 15. In this case, the frame 15 can run flush with the edge 17 of the storage cells 3 or protrude over the edge 17.

Figure 11:
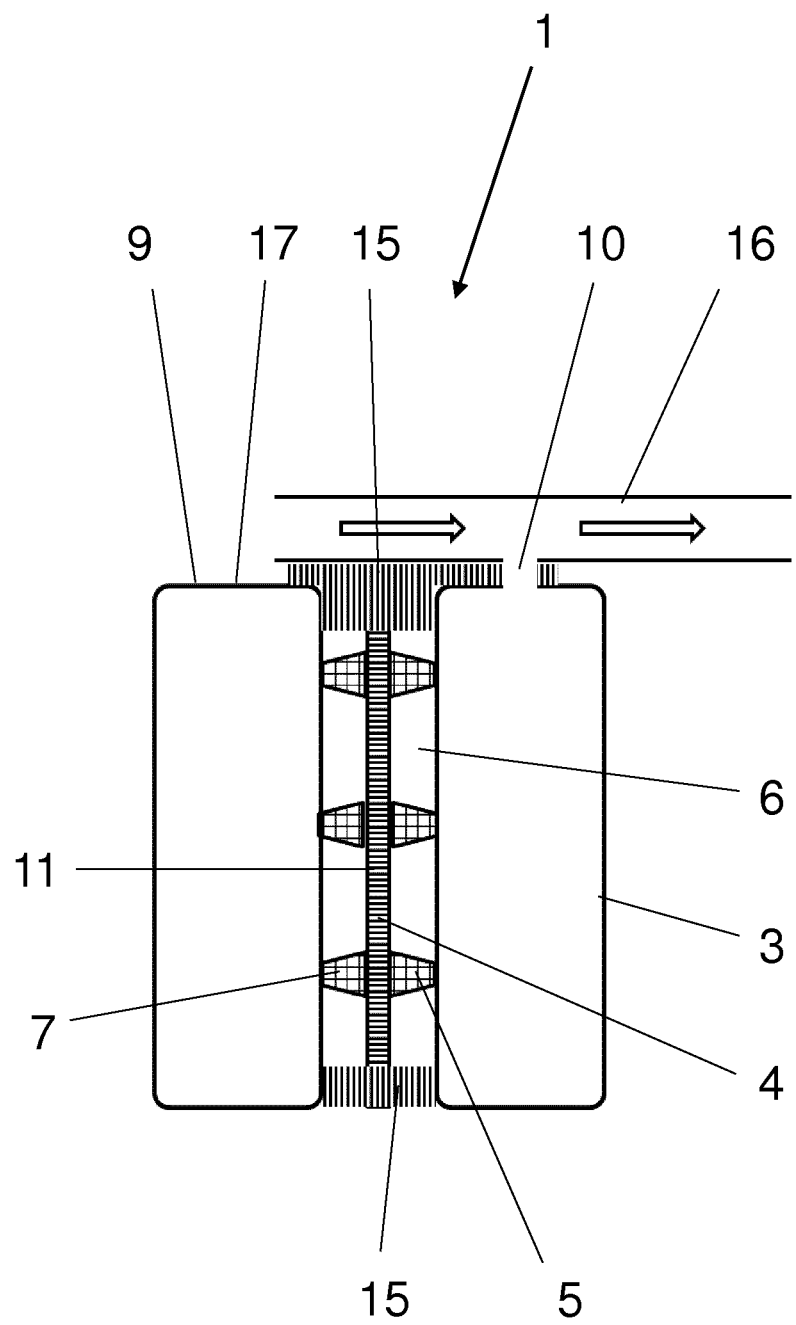
FIG. 11 depicts, according to an embodiment, an energy storage system with emergency opening and outlet channel.

FIG. 11 shows an embodiment according to FIG. 10 in which the device 4 extends at least in sections up to the end face 9 of the storage cell 3. In this case, the frame 15 is designed such that it overlaps the end face 9 of the storage cell 3. The storage cell 3 has an emergency opening 10 which is arranged on the end face 9, wherein the device 4 surrounds the emergency opening 10. As a result, the device 4 forms a seal between the emergency opening 10 of the storage cell 3 and the outlet channel 16, through which medium exiting from the emergency opening 10 of the storage cell 3 can be discharged.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An energy storage system, comprising:
a housing in which a plurality of storage cells are arranged,
wherein the storage cells are thermally insulated from each other via a device arranged between the storage cells, the device comprising a planar base,
wherein the device is designed in such a way that the storage cells are spaced apart from each other,
wherein the device is made from temperature-resistant material, wherein the device has projections and depressions,
wherein the device contains a material which is configured to be subjected to an endothermic chemical conversion when a temperature of 200° C. is exceeded,
wherein the projections comprise protruding webs, each of which is offset, relative to the planar base, from an adjacent protruding web on an opposite side of the planar base, and
wherein the device is made from elastomeric material comprising silicone rubber or fluorosilicone rubber, at least in sections.

2. The energy storage system according to claim 1, wherein the device is three-dimensionally structured.

3. The energy storage system according to claim 1, wherein the device is structured as waffle-shaped.

4. The energy storage system according to claim 1, wherein the device has knob-shaped projections.

5. The energy storage system according to claim 2, wherein the structuring is designed in such a way that, between the section of the device assigned to the edge of the storage cells, a greater contact pressure of the device against the storage cell results than at the remaining sections.

6. The energy storage system according to claim 1, wherein the device extends at least in sections up to an end face of the storage cell.

7. The energy storage system according to claim 6, wherein the storage cell has an emergency opening which is arranged on the end face,
wherein the device surrounds the emergency opening.

8. The energy storage system according to claim 1, wherein the device contains a phase change material.

9. The energy storage system according to claim 1, wherein a cooling device is assigned to the device.

* * * * *